United States Patent [19]

Nozu et al.

[11] Patent Number: 4,777,497

[45] Date of Patent: Oct. 11, 1988

[54] INK JET PRINTING HEAD HAVING A FLEXIBLE FILM COVERED INK SUPPLY CHAMBER

[75] Inventors: Taketo Nozu, Hino; Yoshiaki Kimura, Hachioji; Kiyotaka Murakami, Tokyo, all of Japan

[73] Assignee: Konishiroku Photo Industry Co., Ltd, Tokyo, Japan

[21] Appl. No.: 921,816

[22] Filed: Oct. 21, 1986

Related U.S. Application Data

[63] Continuation of Ser. No. 822,930, Jan. 27, 1986, abandoned, which is a continuation of Ser. No. 731,338, May 6, 1985, abandoned, which is a continuation of Ser. No. 459,268, Jan. 19, 1983, abandoned.

[30] Foreign Application Priority Data

Jan. 25, 1982 [JP] Japan ................................ 57-10727

[51] Int. Cl.[4] ............................................ G01D 15/16

[52] U.S. Cl. .................................. 346/140 R; 73/707; 73/726; 92/104; 138/30

[58] Field of Search .......................... 346/140; 138/30; 73/726, 720, 715, 708, 706; 92/98 R, 104

[56] References Cited

U.S. PATENT DOCUMENTS

| | | | |
|---|---|---|---|
| 2,343,320 | 3/1944 | Parker | 138/30 |
| 2,697,449 | 12/1954 | Svenson | 138/30 |
| 2,942,624 | 6/1960 | Good | 92/104 |
| 3,079,953 | 3/1963 | Mounteer | 92/104 |
| 3,930,260 | 12/1975 | Sicking | 346/140 |
| 4,123,761 | 10/1978 | Kimura | 346/140 |
| 4,124,853 | 11/1978 | Kattner | 346/140 |
| 4,125,845 | 11/1978 | Stevenson | 346/140 |
| 4,263,602 | 4/1981 | Matsumoto | 346/140 |
| 4,342,042 | 7/1982 | Cruz-Uribe | 346/140 |
| 4,347,524 | 8/1982 | Engel | 346/140 |

OTHER PUBLICATIONS

Green, J.; Pressure Surge Accumulator, IBM TDB, vol. 15, No. 3, Aug. 1972, p. 766.

*Primary Examiner*—Joseph W. Hartary
*Attorney, Agent, or Firm*—Finnegan, Henderson, Farabow, Garrett and Dunner

[57] ABSTRACT

An ink jet printing device including a printing head having a nozzle through which ink can be ejected. The head includes an internal chamber ink and ink ejection is caused by internal pressure pulses. The internal chamber is formed in part by a deformable diaphragm which prevents extreme ambient temperature variations from causing damaging liquid pressure fluctuations.

3 Claims, 3 Drawing Sheets

INK JET PRINTING HEAD HAVING A FLEXIBLE FILM COVERED INK SUPPLY CHAMBER

This application is a continuation of application Ser. No. 822,930 filed Jan. 27, 1986, now abandoned, which is a continuation of application Ser. No. 731,338 filed May 6, 1985, now abandoned, which is a continuation of application Ser. No. 459,268 filed Jan. 19, 1983, now abandoned.

BACKGROUND OF THE INVENTION

The present invention relates to ink jet printing apparatus which includes a printing head, and particularly to a printing head which prevents extreme increases or decreases of ink pressure in the printing head.

A typical example of a known ink jet printing apparatus, known as "drop-on-demand", is illustrated in FIG. 1. In the device illustrated there, a nozzle 2 and an ink chamber 4 are filled with ink delivered from an ink supply 15 through a pipe 14. When an electric pulse is applied to a piezoelectric transducing element 7 from a pulse generator 8, the piezoelectric transducing element 7 moves downwardly and deflects or bends a flexible wall or diaphragm 6 causing a sudden decrease in volume of the ink chamber 4. As a result, liquid pressure in the ink chamber 4 increases suddenly and causes an ink droplet 11 to be ejected through the nozzle 2 whereupon it can be printed as a dot on a printing surface 19.

Ink stored in an ink supply chamber 5 replaces the ink in the ink chamber 4 as a result of a pressure differential between the chambers 4 and 5, pressure in the chamber 4 becoming lower as ink is used up. As the volume of ink in the ink supply chamber 5 decreases, the pressure in chamber 5 also decreases and is detected by a pressure detecting means 9. When the pressure in the ink supply chamber 5 becomes less than a predetermined value $P_A$, an automatic valve 10 opens and ink 16 in an ink supply source 15 is pressurized by pressurizing means 17 and flows to the ink supply chamber 5 through the pipe 14. When the pressure in the ink supply chamber 5 reaches a predetermined value $P_B$, the automatic valve 10 closes and terminates flow of ink 16 to the ink supply chamber 5. Thus, the amount of ink in the ink supply chamber 5 is constantly kept at a volume determined by a pressure between $P_A$ and $P_B$ which produces stable ejection of ink droplets 11 from the nozzle 2.

The printing head 1 corresponds to the parts enclosed by the dot-dash lines in FIG. 1 and is connected through a connector 12 to an ink supply system 18 which includes a filter 13, pipe 14, ink supply source 15, and pressurizing means 17. The ejection head 1, after it is manufactured and assembled, usually is filled with liquid (ink) and is stored separately from the printing apparatus with which it is used and is mounted in place thereon when needed. At this time, the printing head 1 is mounted on the printing apparatus and is electrically connected to the pulse generator 8 and to the ink supply system 18 through the connector 12. The inside of the connector 12 is constructed with a self-sealing elastic or rubber device so that no ink leaks out and no air can enter when the connector 12 is attached or detached. As a result of this construction of the printing head 1 and the other component parts associated therewith, replacement of the ejection head is made easy.

There are factors which obstruct normal ejection and flight of ink droplets 11 in these devices. Most frequently, these include air bubbles and solid particles in the nozzle 2 and the ink chamber 4. If air bubbles exist in the nozzle 2 or the ink chamber 4, they can absorb the ejection pressure caused by the actuated diaphragm 6 and can prevent ink droplet ejection, or cause a variance in the flight speed of the droplets, a deviation in the flight path, or may cause the droplets to be split and scattered. Further, if solid particles are in the nozzle 2, normal ejection of ink is obstructed and in the worst case, the nozzle 2 can be clogged. Solid particles in the ejection chamber 4 do not cause immediate problems, but if not prevented usually result in eventual clogging of the nozzle.

Bubbles and solid particles in the ink chamber and nozzle occur, inter alia, when the printing head 1 is subject to unusual impact forces which can cause bubbles to be formed in the ink chamber 4 and/or in the nozzle 2, or when the ambient temperature varies to an extent which causes expansion and contraction of ink in the printing head 1 and resultant bubble formation. Solid particles can be formed by ink in the nozzle 2 which dries and sets when the printing head 1 is unused for a long time or when the ambient temperature is unusually low.

To avoid these problems, it has been proposed that the printing head be filled with a liquid during storage. Such filling liquids include ink from which dye and pigment have been removed, and liquids which are chemically stable and resist evaporation. This measure reduces the likelihood of solid particles in the nozzle 2 and the likelihood that air will be drawn into the nozzle 2 as a result of evaporation of the filling liquid and the formation of air bubbles. In addition, soft rubber has been applied to the outlet of the nozzle 2 with pressure and the automatic valve 10 is maintained closed so that the printing head 1 is perfectly sealed.

The foregoing measures make it possible to prevent inhalation of air through the nozzle and resultant air bubble formation by nominal thermal expansion and contraction of the filling liquid and by unusual impacts on the printing head, as well as the formation of solid particles and bubble formation by evaporation of filling liquid. However, the ambient temperature can reach a level at which the filling liquid expands or contracts to an extent that causes a pressure change in the printing head which exceeds the capability of the seals. At exceedingly low temperatures, liquid pressure in the printing head can drop to a point where the decrease in liquid volume causes damage of structural parts of the printing head. For example, adhesives used to join some of the printing head parts can weaken and be damaged when the filling liquid pressure drops to a very low level. At very high ambient temperatures, the filling liquid expands and can cause an internal pressure rise in the head which also can cause structural part damage.

Furthermore, when a constitutional element with a high transmission factor for the filling liquid is used in the printing head, the filling liquid in the printing head evaporates with time while stored. Again, the internal pressure in the printing head can drop to a point where damage can occur.

The problems described above are not limited to storage conditions but also can arise when the printing head is mounted on the printing apparatus. Thus, when the power is off and the device is not being used, the influence of external temperature changes, evaporation of the filling liquid, etc. are nearly the same as when the printing head is in storage. This is so because it is important at this time that the nozzle 2 be sealed and the automatic valve 10 be closed. Furthermore, at this time, the printing head is filled with ink which, if allowed to dry and set, forms undesirable solid particles.

FIG. 2, which is an enlarged sectional view of FIG. 1 taken along the line A—A, shows a conventional device in which the ink supply chamber 5 has an upper wall formed by a flexible film 21 and having an elastic plate 20 disposed therein and connected to a strain gauge 9. When the liquid pressure in the supply chamber 5 changes as ink is used up, the elastic plate 20 deforms slightly. The deformation is sensed by the strain gauge 9 which in turn controls (opens or closes) the valve 10. However, when the volume of ink in the supply chamber changes abnormally, for example, as a result of a large temperature change, evaporation of ink through the flexible film 21, etc., the elastic plate 20 can deform to a point where the strain gauge 9 is damaged.

Therefore, a main object of the present invention is to provide an ink printing head wherein problems caused by change in the volume of ink or other liquid in the printing head are prevented.

DETAILED DESCRIPTION

Reference will now be made in detail to the preferred embodiments of the invention, examples of which are illustrated in the accompanying drawings.

Figure 1:
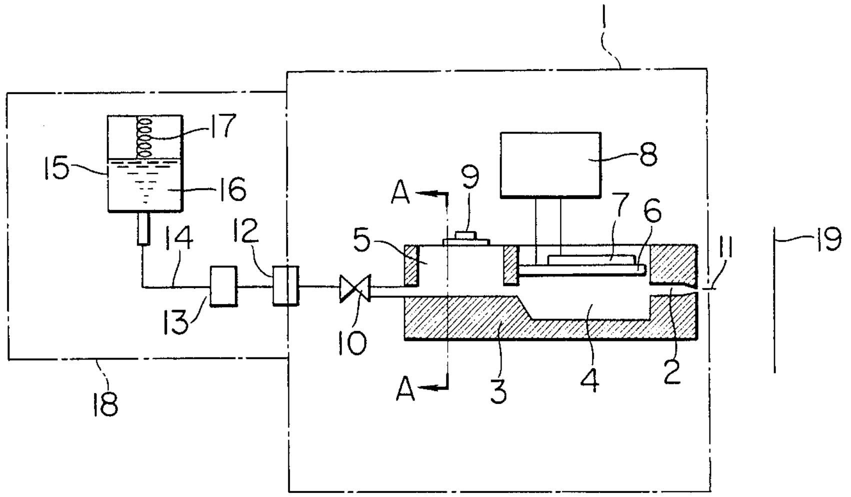
FIG. 1 PRIOR ART
FIG. 1 is a diagrammatic view illustrating a conventional ink jet printing apparatus.
Figure 2:
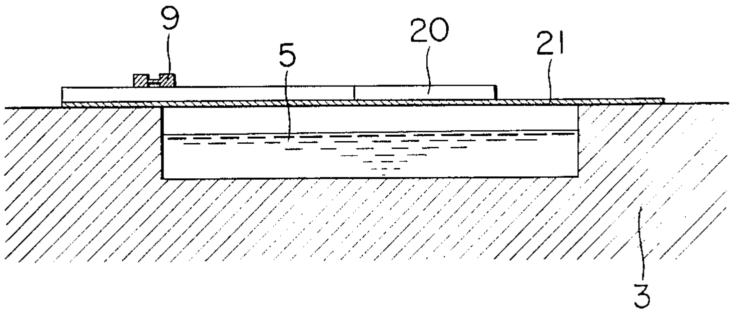
FIG. 2 PRIOR ART
FIG. 2 is an enlarged sectional view of FIG. 1 taken along the line A—A thereof.
Figure 3:
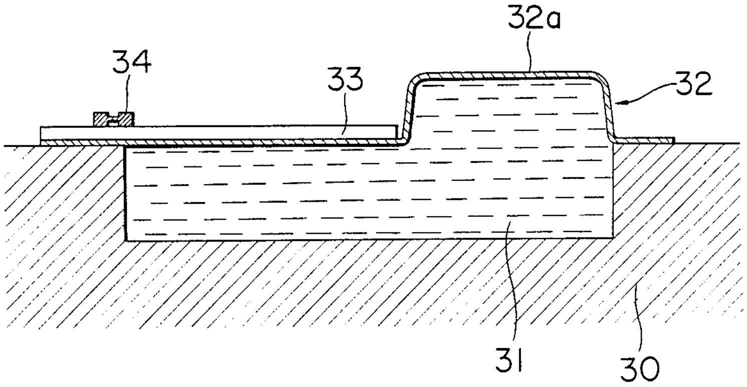
FIG. 3 is a view similar to FIG. 2 and showing an ink supply chamber including a deformable diaphragm constructed according to the present invention.

A preferred embodiment is shown in FIG. 3 which is a sectional view of the parts of the printing head, also referred to as an ejection head, corresponding to the parts shown in FIG. 2. In accordance with the invention and as embodied herein, a base plate 30 which is part of a printing head has an ink supply chamber 31 formed therein and covered by a flexible film or diaphragm which is glued or otherwise secured to the base plate and forms the upper wall of the ink supply chamber 31. The flexible diaphragm 32 has a bag-shaped portion or pouch 32*a*. An elastic plate 33 is fixed on the diaphragm 32 adjacent the pouch 32*a* and has a strain gauge 34 thereon. As in the conventional device described above, liquid pressure in the supply chamber 31 is detected by the strain gauge 34 as the plate 33 deflects and the gauge 34 controls (opens or closes) an automatic valve in a conduit connecting an ink reservoir and the supply chamber 31.

Figure 4:
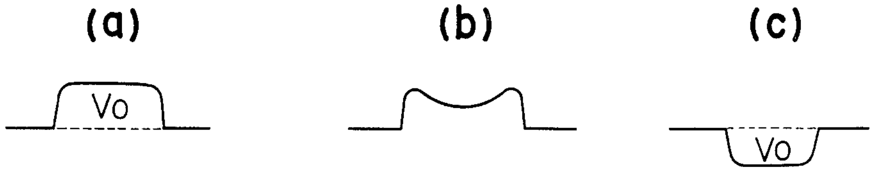
FIGS. 4(*a*), 4(*b*) and 4(*c*) are views illustrating various deformed conditions of the deformable diaphragm of FIG. 3.

FIG. 4 illustrates how the bag-shaped portion or pouch 32*a* of the flexible diaphragm 32 deforms with changes in the volume of ink in the supply chamber 31. FIG. 4(*a*) illustrates a condition wherein the filling liquid fills the supply chamber 31 and the pouch 32*a*. FIG. 4(*b*) illustrates a condition wherein the volume of the filling liquid is slightly reduced. FIG. 4(*c*) illustrates maximum deformation of the flexible wall of the pouch wherein the volume of the filling liquid is further reduced.

It has been found that an ejection head can withstand external environmental conditions (temperature changes) and remain in storage for a long time when constructed according to the present invention wherein the following relationship is satisfied: $V_1 \cdot r \cdot \Delta t + V_2 \leqq 2V_0$, where $V_1$ is the volume of the filling liquid in the ejection head, r is the coefficient of cubical expansion for the filling liquid, $\Delta t$ is the change in the external ambient temperature, $V_2$ is the volume of filling liquid that evaporates from the inside of the ejection head, and $V_0$ is the volume formed by the pouch of the flexible diaphragm.

Figure 5:
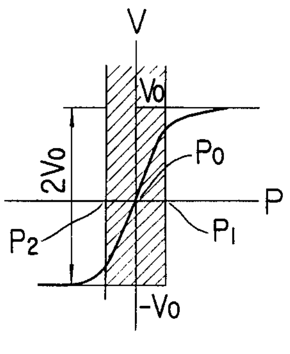
FIG. 5 is a view showing the relationship between liquid pressure and volume change in a printing head embodying the present invention.

FIG. 5 shows the relationship between the pressure in the ejection head and the volume which is formed by the pouch, wherein the pressure $P_0$ is equal to atmospheric pressure. When the diaphragm pouch is so constructed that the above expression is effective within the range of ambient temperature changes and the changes in ink volume caused by the temperature changes, evaporation, etc., namely, within the range of liquid pressure changes $P_1$ and $P_2$ in the supply chamber, the ejection head will not be damaged and can remain in storage for long periods. $P_1$ and $P_2$ represent the upper and lower limits, respectively, of pressure in the ink supply chamber according to changes in ambient temperature. For example, $P_1$ and $P_2 \simeq +0.1$ kg/cm² and $-0.1$ kg/cm², respectively, although the values of $P_1$ and $P_2$ can vary according to the structure of the ink ejection head etc.

A deformable diaphragm 32 made of Saran® film having a shape in accordance with FIG. 4(*a*) and a value $V_0 = 0.1$ cc was installed in an ejection head having an internal volume of 1.5 cc. A filling liquid having a coefficient of cubical expansion $r = 0.5 \times 10^{-3}$ deg$^{-1}$ was utilized. A similar ejection head without a flexible diaphragm according to the invention was filled with a similar liquid. After storage for one week at an ambient temperature of 40° C. and a relative humidity of 30% and under a perfect sealing condition, the conventional head was damaged due to the drop of internal pressure caused by the evaporation of the filling liquid. Also, a conventional, perfectly sealed ejection head 1 manufactured in an environment having an ambient temperature of 25° C. and then placed in an environment having an ambient temperature of 0° C. was immediately damaged as a result of the drop of internal pressure caused by the volume change of the filling liquid.

On the other hand, the printing head having a deformable diaphragm according to the invention was not damaged after two months storage in an ambient temperature of 40° C. and a relative humidity of 30%, nor was it damaged by exposure to an environment having an ambient temperature of 0° C. Further, the internal pressure in the printing head constructed according to the invention hardly changes despite a drop of ambient humidity so that the present invention provides excellent results.

Figure 6:
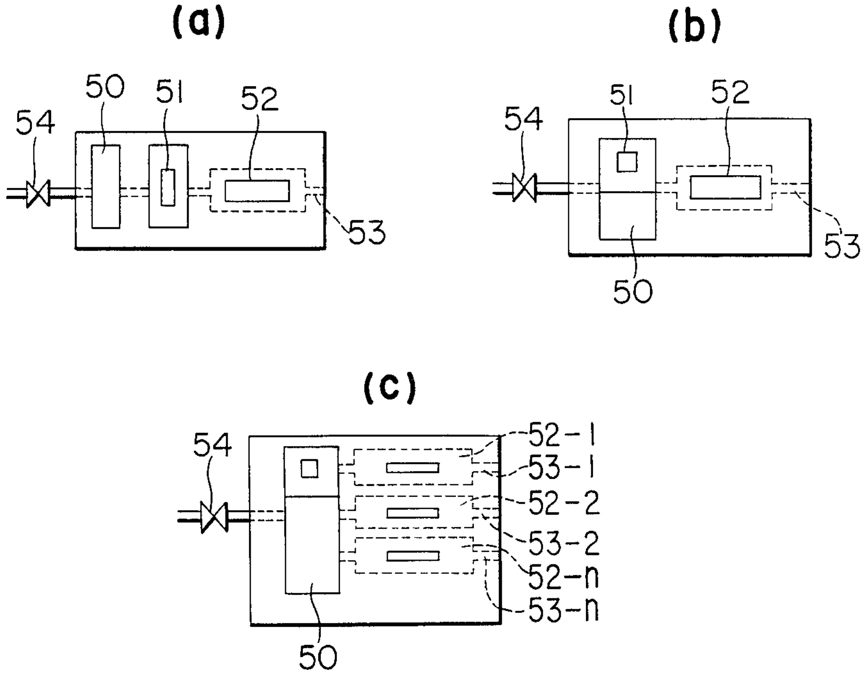
FIGS. 6(*a*), 6(*b*) and 6(*c*) are diagrammatic plan views of ejection printing heads embodying the present invention.

FIGS. 6(*a*), 6(*b*) and 6(*c*) illustrate various ways of incorporating the present invention in a printing head. FIG. 6(*a*) shows a printing head which includes a deformable diaphragm 50 provided between an ink supply chamber 51 and an automatic valve 54. An ink ejection chamber 52 is connected to the supply chamber 51 and to a nozzle 53.

FIG. 6(*b*) illustrates a space saving version wherein a deformable diaphragm 50 is provided at the ink supply chamber 51.

FIG. 6(*c*) illustrates another example of the present invention wherein a deformable diaphragm 50 is provided in an on-demand type printing head having a plurality of nozzles 53 and ejection chambers 52. In this version, a plurality of ejection chambers 52-1 through 52-*n* are connected to a common ink supply chamber provided with the deformable diaphragm 50.

In addition to being space-saving, this device eliminates a problem which arises in conventional on-demand-type printing heads having plural nozzles and ejection chambers. In those conventional heads, a part of the liquid pressure generated in one ejection chamber is transmitted to other ejection chambers through the common ink supply chamber. Consequently, the ejection chambers interact and the speed of the ink droplets varies when other ejection chambers are driven concurrently. Such speed variation greatly deteriorates the resultant printing quality. In some extreme cases, ink droplets are ejected from nozzles even when pulses are not applied. In the present invention, part of the liquid pressure generated is absorbed by the deformable diaphragm which prevents interaction between the ejection chambers.

The deformable diaphragm of the invention desirably possesses a low transmission factor for water vapor and is chemically stable so that it will not damage ink. Many materials possess these characteristics, and plastic films constructed of, for example, polyvinylidene-chloride such as Saran®, polyethylene, polyprophylene, fluororesin, and polyvinylbutylacrylate have been found to be desirable. If a diaphragm constructed of a single material is not satisfactory, a compound composition film can be provided. For example, a polypropylene film on which Saran® resin is coated or polypropylene film wherein polyethylene is laminated thereon can be used.

Figure 7:
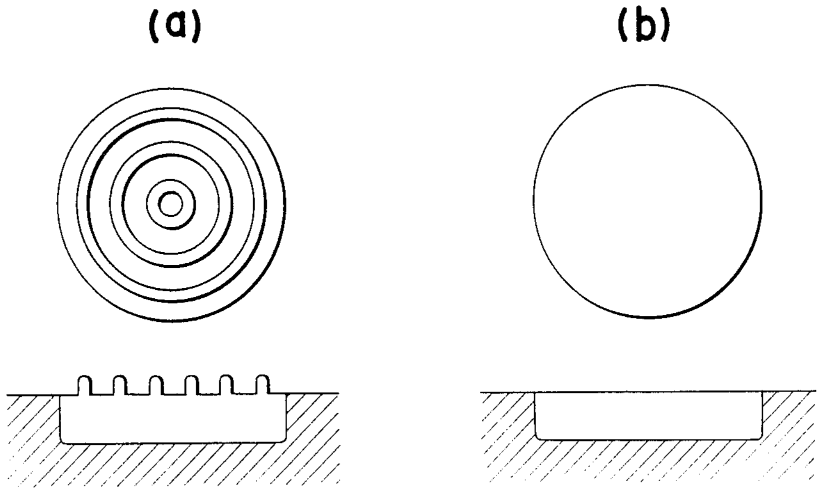
FIGS. 7(*a*) and 7(*b*) are sectional and plan views of ink chambers and modified forms of deformable diaphragms according to the invention.

Furthermore, the deformable diaphragm of the present invention can be constructed of various shapes. Thus, FIG. 7(*a*) shows a wave-shaped deformable diaphragm and FIG. 7(*b*) shows a flat disc shaped deformable diaphragm.

Dispite its simplicity of construction, the present invention provides significantly improved results in that a printing head so constructed can withstand environmental conditions during long periods of storage and during non-operation periods.

What is claimed is:

1. An ink jet printing head comprising:

at least one nozzle from which ink is ejected dropwise;

at least one ejection chamber connected to the nozzle and having a piezoelectric transducing element for causing a sudden increase in the liquid pressure in the ejection chamber in response to an electric pulse;

an ink supply chamber connected to the ejection chamber and connectable to an ink supply system provided outside the printing head;

pressure detecting means for detecting ink pressure in the ink supply chamber and controlling the ink supply from an ink supply source to the ink supply chamber; and a flexible film diaphragm means constituting one wall of the ink supply chamber, the flexible film diaphragm means having an interior side, an exterior side, a bag-shaped portion for deforming responsive to volume changes of ink in the ink supply chamber and having two limit positions of deformation between which the bag-shaped portion is slack and undergoes relatively no change in internal stress and a flat area, and wherein the pressure detecting means is positioned proximate to the flat area, the exterior side of the flexible film diaphragm means being exposed to the atmosphere for maintaining a relatively constant pressure on the exterior side of the flexible film wall means.

2. An ink jet printing head comprising:

at least one nozzle from which ink is ejected dropwise;

at least one ejection chamber connected to the nozzle and having a piezoelectric transducing element for causing a sudden increase in the liquid pressure in the ejection chamber in response to an electric pulse;

an ink supply chamber connected to the ejection chamber and connectable to an ink supply system provided outside the printing head;

pressure detecting means for detecting ink pressure in the ink supply chamber and controlling the ink supply from an ink supply source to the ink supply chamber; and a flexible film diaphragm means constituting one wall of the ink supply chamber, the flexible film diaphragm means including a bag-shaped portion for deforming responsive to volume changes of ink in the ink supply chamber between two limit positions of deformation between which the bag-shaped portion is slack and undergoes relatively no change in internal stress and for maintaining a relatively constant pressure in the ink supply chamber when the bag-shaped portion is between the two limit positions and a flat area, wherein the pressure detecting means is positioned proximate to the flat area.

3. An ink jet printing ejection head comprising:

at least one nozzle from which ink is ejected dropwise;

at least one ejection chamber connected to the nozzle and having a piezoelectric transducing element for causing a sudden increase in the liquid pressure in the ejection chamber in response to an electric pulse;

an ink supply chamber connected to the ejection chamber and connectable to an ink supply provided outside the printing head; and a flexible film diaphragm means constituting one wall of the ink supply chamber, the flexible film diaphragm means constituting one wall of the ink supply chamber, with the flexible film diaphragm means including a bag-shaped portion for deforming responsive to volume changes of ink in the ink supply chamber and satisfying the following relationship $$2V_0 \geqq V_1 \cdot r \cdot \Delta t + V_2$$

where:

$V_0$ = volume formed by the bag-shaped portion of the flexible film diaphragm $V_1$ = volume of filling liquid in the ejection head $r$ = coefficient of cubicle expansion for the filling liquid $\Delta t$ = change in external ambient temperature $V_2$ = volume of filling liquid that evaporates from inside the ejection head.

* * * * *